United States Patent

Essigmann

[11] Patent Number: 5,850,391
[45] Date of Patent: Dec. 15, 1998

[54] SHARED INTERWORKING FUNCTION WITHIN A MOBILE TELECOMMUNICATIONS NETWORK

[75] Inventor: Kurt Essigmann, Aachen, Germany

[73] Assignee: Telefonaktiebolaget L M Ericsson, Stockholm, Sweden

[21] Appl. No.: 730,812

[22] Filed: Oct. 17, 1996

[51] Int. Cl.$^6$ .................................................. H04L 12/50
[52] U.S. Cl. ........................ 370/331; 370/385; 455/439
[58] Field of Search .................. 370/331, 352, 370/355, 389, 410, 474, 522; 455/435, 436, 437

[56] References Cited

U.S. PATENT DOCUMENTS

| | | | |
|---|---|---|---|
| 5,325,419 | 6/1994 | Connolly et al. | 455/435 |
| 5,396,543 | 3/1995 | Beeson, Jr. et al. | 455/560 |
| 5,408,419 | 4/1995 | Wong | 364/514 |
| 5,629,974 | 5/1997 | Rajala et al. | 455/466 |
| 5,664,004 | 9/1997 | Durchmann et al. | 455/466 |

FOREIGN PATENT DOCUMENTS 0 714 214 A2  5/1996  European Pat. Off. .

OTHER PUBLICATIONS

*Cellular Data Services Architecture and Signaling* by Jay Jayapalan and Mike Burke, IEEE Personal Communications, Second Quarter 1994, New York U.S. pp. 44–55.

*Integration of Intelligent Network Services into Future GSM Networks* by Mikko Laitinen and Jari Rantala, IEEE Communications Magazine, Jun. 1995, New York, U.S. pp. 76–86.

*Signaling Protocol Architecture for a Digital Mobile Communications Network* by Akihisa Nakajima and Kouji Yamamoto, NTT Mobile Communications Division Musashino, Japan Takanori Utano, NTT Engineering Strategy Planning Headquarters Tokyo, Japan Shigefusa Suzuki, NTT Radio Systems Laboratories Yokosuka, Japan 433a Electronics and Communications in Japan, Part I Communications 74(1991) Jun., No. 6, New York, U.S.

Griffiths, J., ISDN Explained: Worldwide Network and Applications Technology, p. 33–35 and 124, 1992.

*Primary Examiner*—Chi H. Pham
*Assistant Examiner*—W. Todd Baker
*Attorney, Agent, or Firm*—Jenkens & Gilchrist, P.C.

[57] ABSTRACT

A mobile switching center (MSC) not equipped with the necessary hardware/software devices or modules communicates with a Shared Interworking Function node to provide an Interworking function (IWF) service to a particular mobile station. Control data associated with the requested IWF service are transported from the serving MSC to the SIWF node using basic and supplementary Integrated Service Digital Network User Part (ISUP) signals. Such control data are encapsulated into optional parameters within the transmitted ISUP signals and transparently transported from the serving MSC to the SIWF telecommunications node.

28 Claims, 7 Drawing Sheets

FIG.7

400 — RECEIVING AN INDICATION REQUESTING DATA CALL AT A SERVING MSC

410 — DETERMINING THAT THE SERVING MSC. DOES NOT HAVE THE REQUISITE DEVICE

420 — IDENTIFYING A SWIF NODE EQUIPPED WITH THE REQUISITE RESOURCE

430 — TRANSMITTING A FIRST ISUP SIGNAL TOWARDS THE SWIF NODE, THE FIRST ISUP SIGNAL INCLUDING FIRST OPTIONAL PARAMETERS WITH IWF CONTROL INFORMATION

440 — RECEIVING THE FIRST ISUP SIGNAL BY THE SWIF NODE THEREBY ESTABLISHING A TRUNK CALL CONNECTION BETWEEN THE SERVING MSC AND THE SWIF NODE

450 — EXTRACTING THE IWF CONTROL INFORMATION FROM THE RECEIVED ISUP SIGNAL

460 — DETERMINING THE APPROPRIATE DEVICE

470 — ESTABLISHING A CALL CONNECTION WITH THE DETERMINED DEVICE IN ACCORDANCE WITH THE EXTRACTED CALL CONTROL INFORMATION

480 — TRANSMITTING A SECOND ISUP SIGNAL FROM THE SWIF NODE TO THE SERVING MSC, THE SECOND ISUP SIGNAL INCLUDING SECOND OPTIONAL PARAMETERS WITH A RESULT OF SAID CALL CONNECTION

490 — TRANSMITTING ADDITIONAL IWF CONTROL INFORMATION BETWEEN THE SERVING MSC AND THE SWIF NODE USING ADDITIONAL ISUP MESSAGES

SHARED INTERWORKING FUNCTION WITHIN A MOBILE TELECOMMUNICATIONS NETWORK

BACKGROUND OF THE INVENTION

1. Technical Field of the Invention

The present invention relates to mobile radio telephone systems and, in particular, to the communication of control data within a shared interworking function (SIWF) within a telecommunications network.

2. Description of Related Art

In general, a typical mobile telecommunications system includes a plurality of mobile switching centers (MSCs), each of which provides mobile service to mobile stations located within a specific geographic area known as an MSC coverage area. Each MSC coverage area is further partitioned into a number of smaller geographic areas known as Location Areas. Each Location Area, in turn, is further divided into a number of Cell Areas.

Whenever a particular mobile station requests mobile service within a particular cell area, an appropriate base station providing mobile coverage for that particular cell area detects the transmitted request and forwards the received signal to the connected mobile switching center (MSC). The MSC then determines the identity of the associated mobile subscriber requesting the mobile service, analyzes the received data, and provides the appropriate mobile service requested by the determined mobile subscriber. Accordingly, it is the MSC that stores and executes the appropriate application layer modules along with other necessary hardware and software resources to provide the requested mobile service to the mobile subscribers currently traveling within its MSC coverage area. Such hardware and software resources include special subscriber feature modules, announcement machines, fax adapters, modem pools, rate adapters, and other voice and data control devices along with their drivers.

Since each MSC has to independently analyze the received data and provide the requisite mobile service to the associated mobile subscribers, each and every MSC within a selected Public Land Mobile Network (PLMN) serving the associated mobile subscribers must be equipped with the same software and hardware modules and resources to provide uniform service to the associated mobile subscribers. Such service includes not only voice service but also data service. As an illustration, in order to accommodate data services within a mobile telecommunications network, each MSC within the serving PLMN has to incorporate data management function known as Interworking Function (IWF) to supply modem and fax adapter tools as well as to provide rate adaption within the system. Accordingly, in order to enable a particular mobile subscriber to communicate data via modem with a computer terminal associated with a particular Public Switched Telephone Network (PSTN) throughout the PLMN, each and every MSC within the PLMN must be equipped with the IWF and its associated modem pool. Requiring every MSCs within a particular PLMN to be equipped with a full complement of such devices and drivers is expensive and inefficient. It is inefficient because IWF service may be used infrequently within the majority of MSCs in a PLMN. Furthermore, in order to maintain and upgrade the installed devices, each and every MSC has to be serviced.

With the continuing development of mobile telecommunications systems, such as the Global System for Mobile (GSM) communications standard, the concept of Shared Interworking Function (SIWF) has been introduced to eliminate some of the inefficiency and wastefulness discussed above. In accordance with the SIWF concept, the requisite hardware and software modules and devices are provided at one selected node (e.g., SIWF MSC) within the serving PLMN. Each of the other nodes (e.g., serving MSCs) may also maintain an IWF but can additionally provide IWF service to its mobile subscribers by communicating with the node equipped with the SIWF to obtain the necessary service. As a result, the concept of SIWF provides the possibility of providing specific functionality needed for data services in areas where data traffic is expected to be low and deemed too costly to locally install the necessary hardware and software modules or to install a sufficiently large capacity or particular type of hardware of software modules. It further enables the handling of data calls by another telecommunications node in case of local overload of data traffic by the serving MSC. Additionally, it enables faster introduction and roll-out of new data services.

In order to access service from the SIWF node, the MSC serving the mobile subscriber needs to communicate not only subscriber received data but also control data indicating what type of device to use and what controlling parameters and settings to be applied. However, a system, such as the Mobile Telephony Subsystem (MTS), for controlling the MSC to provide mobile service has well defined communications signals and protocols. As a result, introducing new signal messages, protocols, and parameters for communicating such control data is undesirable and inefficient. Any new signal messages and protocols introduced must be reviewed and approved by the governing standardization committees. Furthermore, each and every intermediate and transferring node connecting the serving MSC with the SIWF MSC must also be updated to receive and recognize the new signals.

Accordingly, there is a need for a mechanism to enable the serving MSC to communicate SIWF control data with the SIWF node transparently through the connecting network and without introducing new signal protocols.

SUMMARY OF THE INVENTION

The present invention discloses a method and apparatus for communicating interworking function (IWF) control data between a mobile switching center (MSC) serving a particular mobile station and a telecommunications node equipped with necessary hardware and software modules for providing the requested IWF service to the mobile station. In response to a receipt of an indication to provide IWF service to the mobile station, the serving MSC identifies the IWF control data associated with the indicated IWF service. The serving MSC then encapsulates the identified IWF control data into an optional parameter within an Integrated Service Digital Network User Part (ISUP) signal. Utilizing a directory number assigned to the telecommunications node as the called party number, the serving MSC then transmitted the ISUP signal encapsulating the IWF control data towards the telecommunications node. The encapsulated IWF control data are then transported transparently through the intermediate nodes connecting the serving MSC with the destination telecommunications node.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
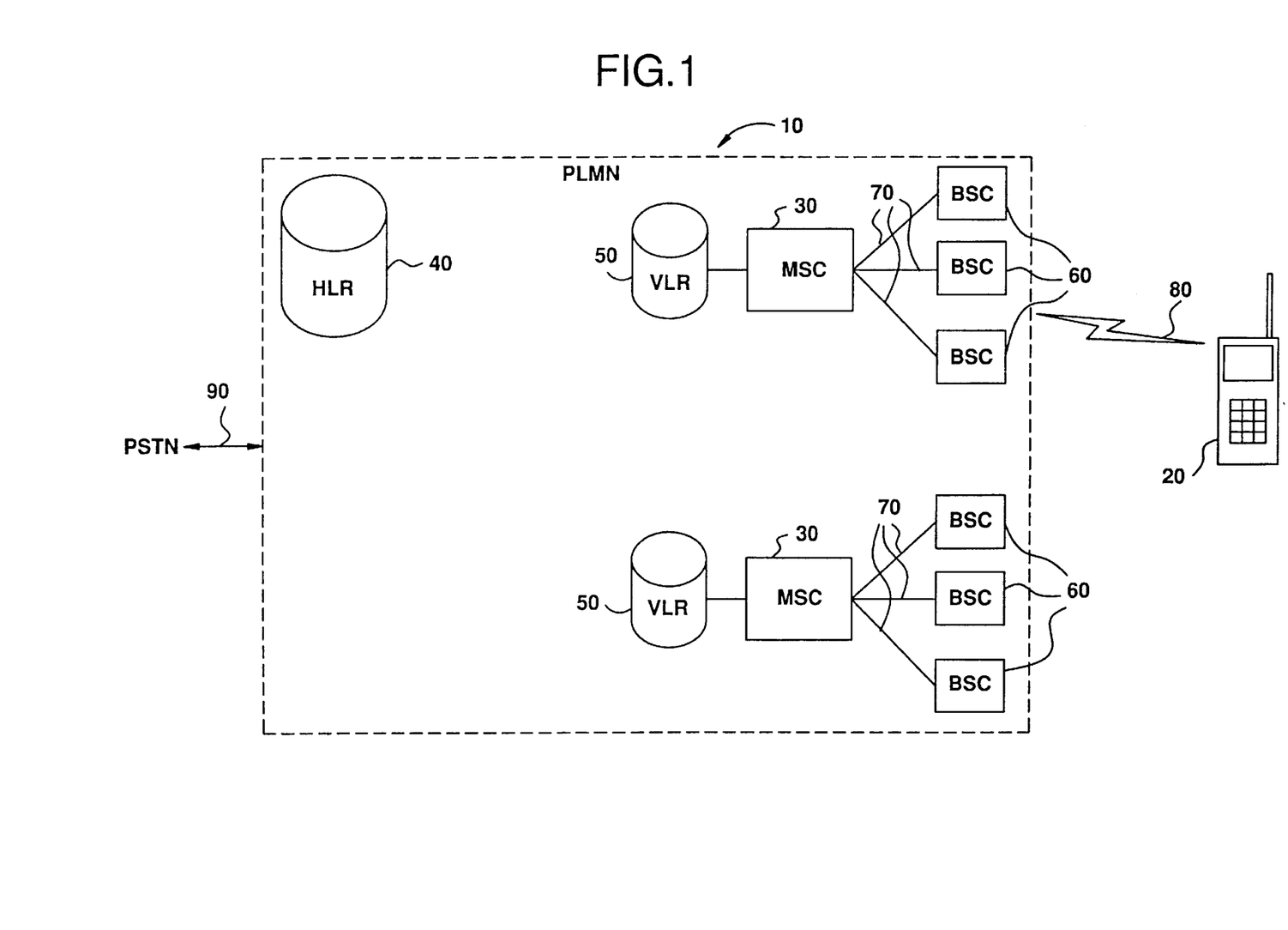
FIG. 1 is a block diagram of a Public Land Mobile Network (PLMN) providing mobile service to a mobile station and connecting to other communication networks.

FIG. 1 is a block diagram of a Public Land Mobile Network (PLMN) providing mobile service to a mobile station and connecting to other communication networks. The PLMN 10, which is used to communicate with a mobile station 20, comprises a number of mobile switching centers (MSCs) 30, home location register 40 (HLR), visitor location registers (VLRs) 50, and base station controllers (BSCs) 60. Each BSC 60 is connected to an appropriate MSC 30 using a communications link 70 and controls a number of base stations (BS, not shown in FIG. 1). Using one of its associated BSs, the BSC 60 communicates with the mobile station 20 via a radio channel 80. The mobile station 20 further communicates with other subscribers, such as a wireline terminal (not shown in FIG. 1) via a connection 90 to a Public Switched Telephone Network (PSTN). The HLR 40 is a centralized database containing information about all "home" subscribers, their services and location. For example, the HLR 40 contains subscriber category information reflecting whether a particular subscriber has a subscription to a particular call forwarding feature, and if the subscriber has the feature activated, the identity of the forward-to-number.

A call or mobile service from the mobile subscriber starts when the mobile subscriber first keys in the desired destination number or service code and then presses the send button. An access channel is seized, whereupon the mobile identity and the entered numbers are automatically transmitted to the MSC 30 via the BSC 60. By utilizing subscriber information previously retrieved from the associated HLR 40, the MSC 30 then verifies that the caller has access to the system. The keyed numbers are also analyzed to determine if the caller is allowed to call that particular number or to invoke a service associated with the entered service code or command. If all analyses are affirmative, the mobile station 20 is assigned to an analog or digital channel 80 and the service (e.g., call connection) is provided.

Accordingly, it is the serving MSC 30 that stores and executes the appropriate application layer modules along with other necessary hardware and software resources for providing the requested mobile service to the mobile subscriber currently traveling within its coverage area. Such hardware and software resources include special subscriber feature modules, announcement machines, fax adapters, modem pools, rate adapters, and other data and voice control devices along with their drivers.

Figure 2:
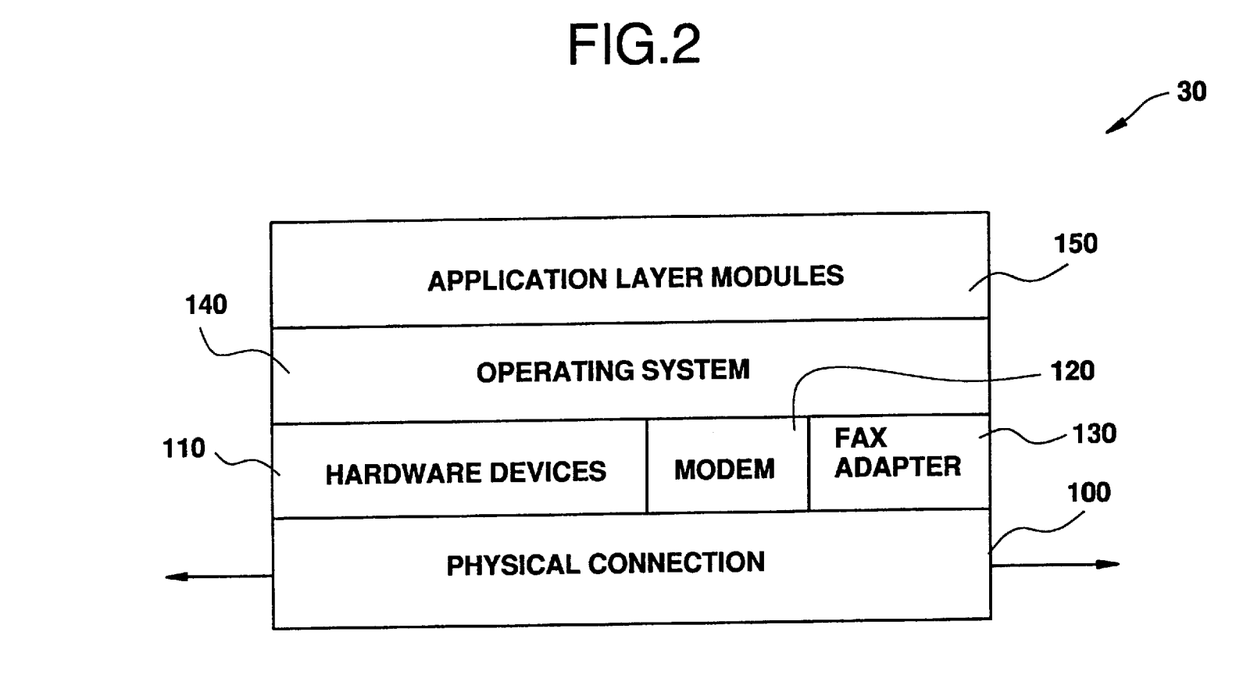
FIG. 2 is a block diagram of a mobile switching center (MSC) providing data service to a mobile station.

Reference is now made to FIG. 2 illustrating the logical architecture of the MSC 30 (FIG. 1) for providing mobile service to the mobile station 20. At the lowest level of the MSC 30, in accordance with the Open System Interface (OSI) standard, a physical connection 100 to other nodes within the connected telecommunications network is provided. One such connection is to a number of BSCs 60, each of which controls a plurality of BSs, associated with the serving MSC 30 and providing radio coverage over particular cell areas. Other such connection is to another MSC 40 or other telecommunications node connected to the serving PLMN or PSTN. On top of the physical connection level 100, hardware devices and modules 110 for providing requisite mobile service to mobile subscribers are shown. Such hardware devices include, for example, a modem 120 and fax adapter 130 for communicating data over a connected telecommunications network. On top of the hardware devices and modules is the operating system 140 for interfacing and controlling the hardware devices and modules 110. As an illustration, the operating system 140 includes drivers for controlling the modem 120 and fax adapters 130. Functioning as an interface, the operating system 140, in turn, enables application layer modules 150 to access and utilize the hardware devices and physical connections lying below to provide the requested mobile service to the associated mobile subscribers.

As suggested by the above descriptions of the modem 120 and fax adapters 130, mobile subscribers are no longer limited to communicating voice data over a radio channel. Especially with the introduction of the Global System for Mobile (GSM) communications and digital communications, such as the technique of time division multiple access (TDMA) and code division multiple access (CDMA), a mobile subscriber is able to connect to a computer terminal using a modem device associated locally within the serving MSC. The mobile subscriber is further able to transmit and receive fax data using fax adapters associated with the serving MSC. Such data services are known as interworking function (IWF) service for performing the adaptation or interworking between user data carried over the connection 70 from the BSC 60 into a format to be used on the interworking data network. As an illustration, IWF applies to all circuit switched data services (as defined in TS GSM 02.02 and TS GSM 02.03), as well as to the GSM phase 2+ services including:

BS 2x (asynchronous bearer services) interworking either with the 3.1 KHz audio mode or in UDI mode (using V.110 rate adaption);

BS 3x (synchronous bearer services) interworking either with the 3.1 KHz audio mode or in UDI mode (using V.110 rate adaption, or X.31 flagstuffing);

TS 61 and 62 (facsimile group 3 teleservices) interworking only with the 3.1 KHz audio mode;

BS 4x (PAD Access);

BS 5x (Packet Access);

BS61 (Alternate Speech/Data);

BS81 (Speech followed by Data);

Data compression for Non Transparent Dataservices;

High Speed Circuit Switched Data (HSCSD); and

Other future services may be included as well, e.g., General Packet Radio Service (GPRS) and PDS.

There are a number of MSCs within a particular PLMN, each providing mobile service for a limited geographic area. Therefore, in order to provide uniform IWF data service to a mobile station throughout the serving PLMN, each and everyone of the above MSCs must be equipped with all the necessary IWF hardware/software modules and devices. The provided IWF hardware/software modules and devices must also have sufficient capacity to manage the anticipated data service traffic. Such requirements are inefficient and wasteful for a service provider operating and maintaining the mobile telecommunications network. It is wasteful because IWF service within each MSC may be used infrequently within the majority of the MSCs. It is inefficient, because in order to maintain and upgrade the installed devices, each and every MSC must be manually serviced.

Figure 3:
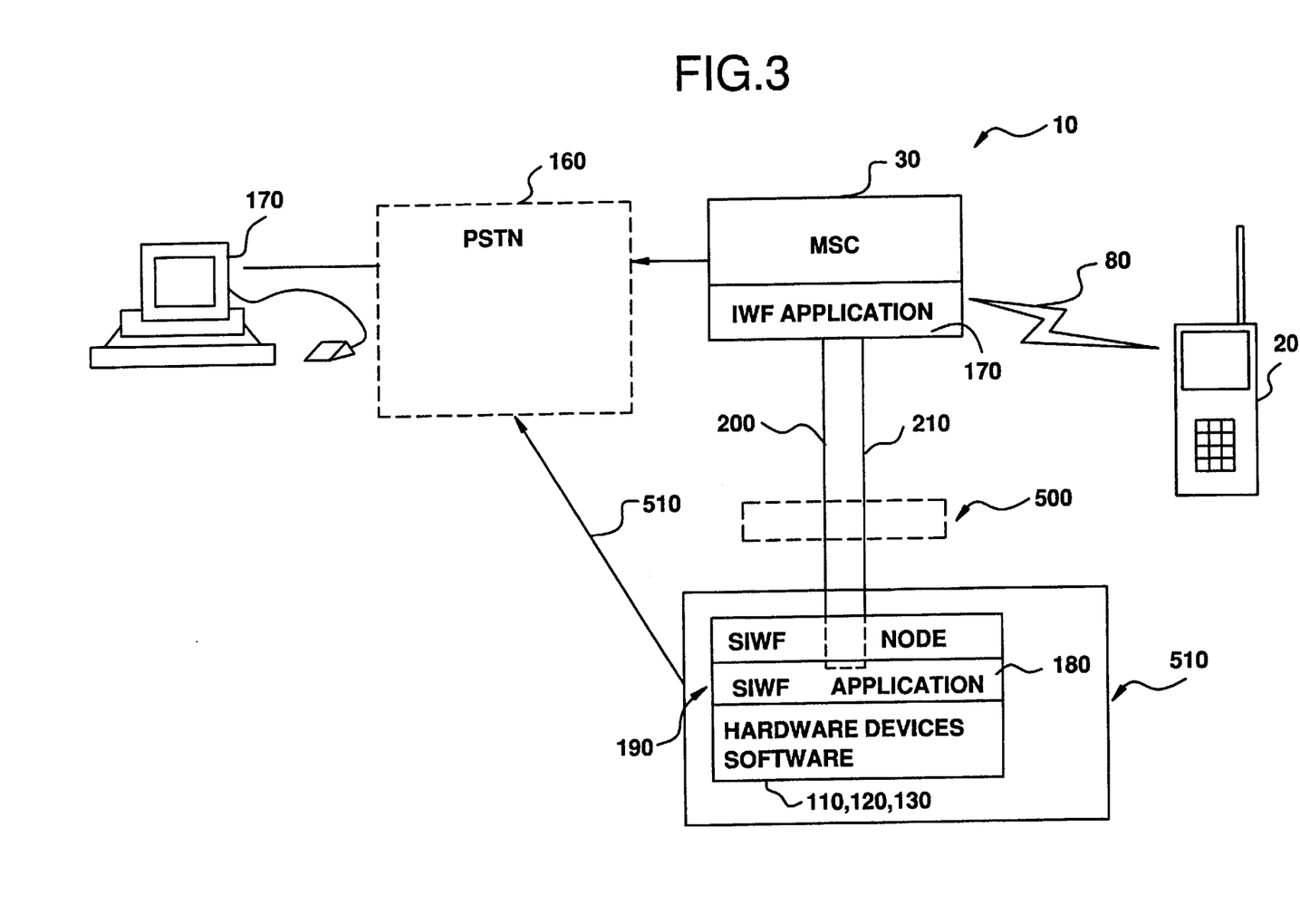
FIG. 3 is a block diagram of a PLMN illustrating a shared interworking function between two different nodes to provide data service to a mobile station.

In order to eliminate some of the above undesirable characteristics associated with IWF data services, the concept of Shared Interworking Function (SIWF) has been introduced. Reference is now made to FIG. 3 illustrating the concept of shared interworking function (SIWF) to provide IWF service to the mobile station 20. In accordance with the SIWF concept, the requisite hardware and software modules 110, 120, 130 for providing IWF service are installed at one node 190 (SIWF node) associated with the serving PLMN 10. Such a node may be an independent telecommunications node 190 or may be associated within another mobile switching center (MSC) 510 located within the serving PLMN. It may further be a Signaling System No. 7 (SS7) based telecommunications node 510 associated with the serving PLMN or PSTN. Other MSCs 30 within the serving PLMN 10 not equipped with the requisite IWF hardware and/or software modules (or equipped with an insufficient number or type of such IWF equipment of software) then communicate with the SIWF telecommunications node 190 to provide the requested IWF service to the mobile subscriber 20.

As an illustration of SIWF functionality, the serving MSC 30 receives an indication to provide IWF service to the mobile station 20. For an outgoing call connection, such an indication includes a Direct Transfer Application Part (DTAP) based signal received from the mobile station 20 over a radio channel. On the other hand, for incoming call connections, such an indication includes a terminating call setup request received over the connected Signaling System No. 7 (SS7) telecommunications network. An interworking function (IWF) application module 170 within the serving MSC 30 then determines that the IWF of the serving MSC 30 is not capable of providing the requested IWF service. For example, the serving MSC 30 might not be equipped with a modem device for establishing a modem connection with a computer terminal 170. Alternatively, all of the installed devices or modems could already be utilized by other calls within the same serving MSC 30. After making such a determination, the IWF application module 170 transmits an Integrated Service Digital Network User Part (ISUP) based call setup signal, such as an Initial Address Message (IAM), towards the SIWF Enode 190 using a directory number assigned to the SIWF node 190 as the called party number. The IAM signal is then properly routed to the specified SIWF node and, as a result, a first circuit call connection 200 between the serving MSC 30 and the SIWF node 190 is established. An SIWF application module 180 within the SIWF telecommunications node 190 then seizes the appropriate hardware and/or software module or device, links the seized module or device with the first circuit call connection, and enables the seized module or device to control and alter the data received over the first circuit call connection 200 from the serving MSC 30. Such alteration includes modulating and de-modulating analog and digital data communicated with the mobile station 20. In case of a terminating call connection towards the mobile station 20, after the successful seizure, the SIWF node 190 transmits another ISUP based call setup signal, such as an IAM, towards the serving MSC 30 to establish a second circuit call connection 210 between the SIWF node 190 and the serving MSC 30. The second circuit call connection 210 is required to communicate the data that has been altered by the seized device from the SIWF node 190 back to the serving MSC 30. After receiving the altered data over the second circuit call connection 210, the serving MSC 30 communicates the altered data with the mobile station 20.

On the other hand, for an outgoing call connection originated by the mobile station 20, there is no need for the SWIF node 190 to loop the trunk call connection back to the serving MSC 30. The SWIF node 190 instead directly establishes a call connection 510 with the connected PSTN and routes the altered data to the called party terminal.

However, in order to access IWF service from the SIWF node 190, the serving MSC 30 needs to communicate not only the data received from/towards the mobile station but also the control data associated with the requested IWF service. As an illustration, for a modem connection to the computer terminal 170 connected to the PSTN 160 as described above, the control data indicating the baud rate, terminal protocol type, parity data, and other synchronization data required for proper communication between the two terminals need to be communicated to the SIWF node 190. Accordingly, a separate communication mechanism for transporting such control data from the serving MSC 30 to the SIWF node 190 is needed.

Introducing new signal protocols and/or parameters for communicating such control data between the serving MSC 30 and the SIWF node 190 is undesirable and cumbersome. Any new signal protocol must be reviewed and approved by the governing standardization committees, such as the European Telecommunications Standard (ETU) and American National Standards Institute (ANSI). Furthermore, each intermediate and transferring node connecting the serving MSC 30 with the SIWF node 190 must further be updated to receive and recognize the new signals. Similarly, utilizing the existing application layer connection-less signal protocols is also undesirable. Mobile Application Part (MAP), Transaction Capabilities Application Part (TCAP), or other Signaling Connection Control Part (SCCP) based signals can be utilized to transport the necessary control data from the serving MSC 30 to the SIWF node 190. However, since these SCCP based signals must be transmitted separately from the established first circuit call connection 200, the receiving SIWF node 190 has to identify and correlate the received control data with the established first circuit call connection 200. Furthermore, since application layer signals are normally transported with lower priority than circuit call connection setup signals within the connected SS7 telecommunications network, the SIWF node 190 may receive the control data far after establishing the first circuit call connection 200 with the serving MSC 30. Not knowing what device, parameters, and settings to apply, the SIWF has no means to seize and link in the appropriate device.

Figure 4:
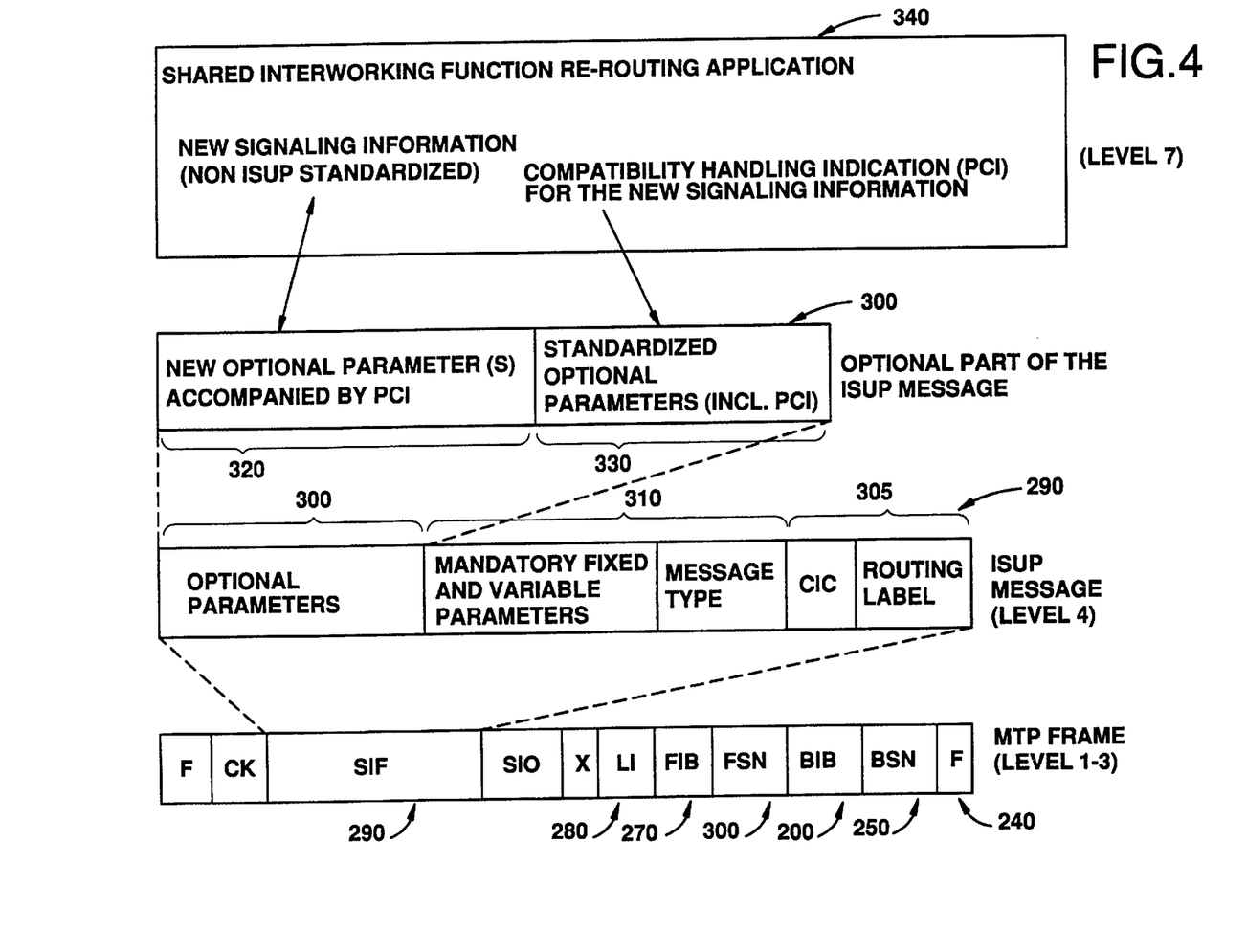
FIG. 4 is a signal protocol diagram illustrating the format of an Integrated Service Digital Network User Part (ISUP) signal for encapsulating interworking function (IWF) control data.

Reference is now made to FIG. 4 illustrating an ISUP signal format for encapsulating and transporting IWF control data (CD) between the serving MSC and the SIWF telecommunications node in accordance with the teachings of the present invention. The Message Transfer Part (MTP) frame 230 acts as the carrier for all SS7 messages, including ISUP, SCCP, TCAP and MAP, providing reliable transfer of messages from one signaling point to another. The MTP 230 provides all functions of layers one, two, and three in the OSI model. It includes the flag (F) 240 for signifying the beginning of a signal unit and the end of the preceding signal unit. It further contains the basic error control method for maintaining proper transmission of SS7 messages by utilizing the forward indicator bit (FIB) 270, backward indicator bit (BIB) 260, Forward Sequence Number (FSN) 300, and Backward Sequence Number (BSN) 250. The Length Indicator (LI) 280 is further utilized to determine which type of signal unit is being transmitted. Lastly, it contains the signal information field (SIF) 290 for transporting the ISUP, TCAP, or other MTP based data to the destination node.

ISUP signals or messages are used to set up and tear down all circuits used for data or voice calls in the PSTN. Accordingly, there are two types of ISUP service: basic and supplementary. Basic service provides the support for establishing connections for circuits within the network. These circuits can be audio circuits for voice transmission or data circuits for any digital information, voice or data. Supplementary services are all other circuit-related services, which typically encompass message transport after a call path is established. For ISUP signals (or messages), there are basically three parts within the ISUP SIF field 290 within the MTP frame 230. There are the header 305 including the routing label and the circuit identification code (CIC), mandatory parameters 310 which must be defined for every ISUP signal, and the optional parameter 300 for including additional optional data or parameters. Further within the optional parameter 300, there are the standardized optional parameters 330, such as a compatibility handling indication (PCI), and the new optional parameters 320. In accordance with the teachings of the present invention, the SIWF control data are inserted into the new optional parameters 320 along with compatibility handling information for the new signaling information in the standardized optional parameters 300.

Before and after a particular call connection, basic service signals, such as Initial Address Message (IAM) and Release (REL) signals, are utilized to encapsulate and transport the necessary IWF control data. On the other hand, during a circuit call connection, supplementary service signals, such as Call Progress (CPG) signals, are utilized to encapsulate and transport the necessary IWF control data between the serving MSC and the SIWF node.

Figure 5:
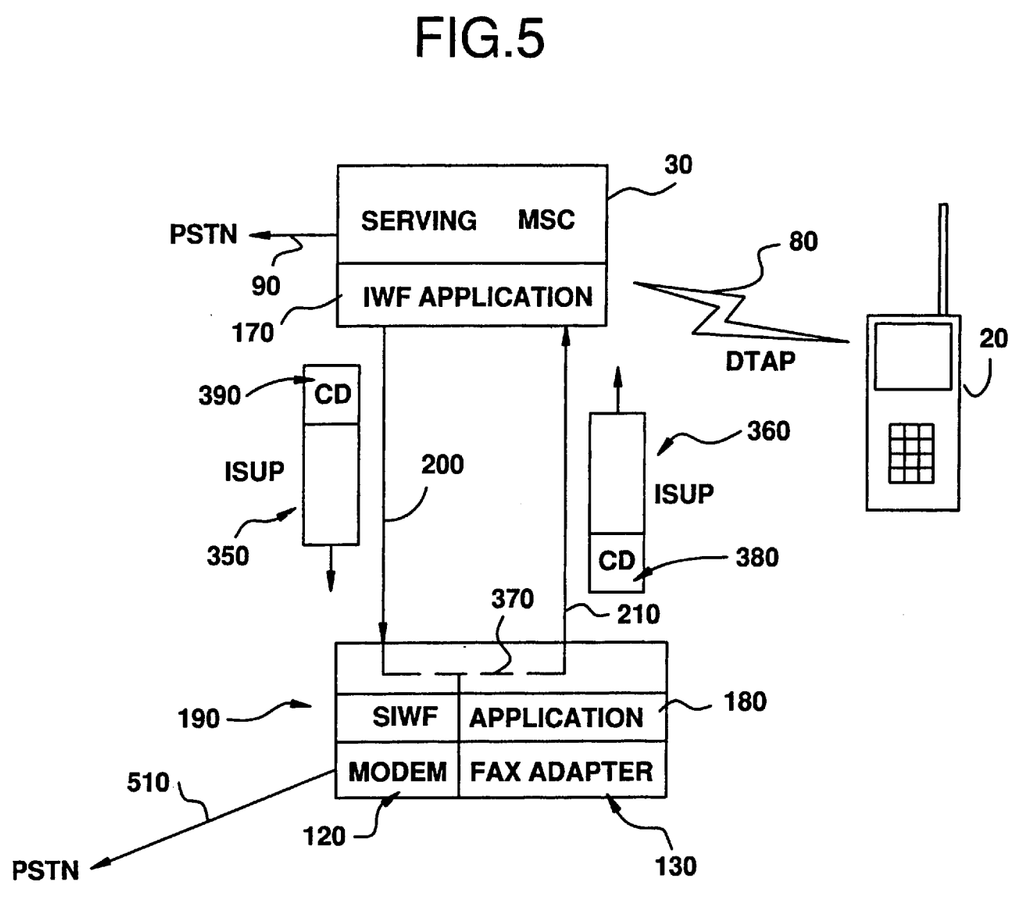
FIG. 5 is a block diagram of a PLMN illustrating the communication of IWF control data between the serving MSC and the SIWF node using ISUP messages in accordance with the teachings of the present invention.
Figure 6:
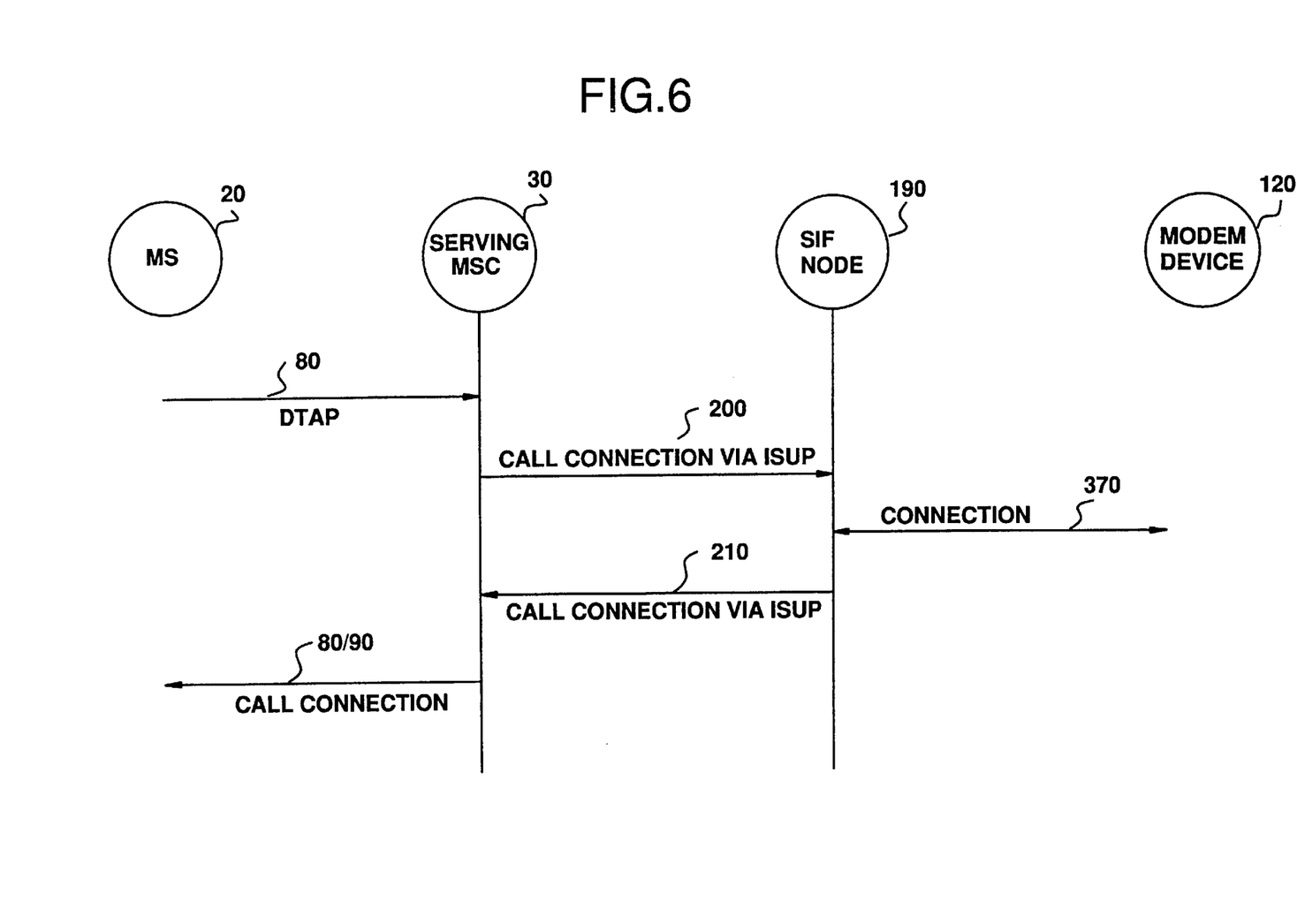
FIG. 6 is a signal sequence diagram illustrating the communication of IWF control data between the serving MSC and the SIWF node using ISUP messages in accordance with the teachings of the present invention.

Reference is now made to both FIGS. 5 and 6 illustrating the communication of IWF control data (CD) 380–390 between the serving MSC 30 and the SIWF node 190 using ISUP messages 350–360 in accordance with the teachings of the present invention. The IWF application module 170 within the serving MSC 30 receives an indication requesting IWF service towards the mobile station 20. Such an indication may be a DTAP signal 80 for an outgoing call connection, terminating call setup signal for an incoming call connection, or service codes or other commands indicating an IWF service request during an already established call connection. In response to such an indication, the IWF application 170 identifies the appropriate IWF control data associated with the requested IWF service and transmits a first ISUP signal 350 using a directory number assigned to the SIWF telecommunications node 190 as the called party number. The optional parameters within the transmitted ISUP signal 350 encapsulates the IWF control data (CD) 390 identified by the IWF application module 170 in effect defining a protocol for the communications of the control data (CD) from one node to another node. As a result, a first circuit call connection 200 from the serving MSC 30 to the SIWF telecommunications node 190 is established. The SIWF application module 180 within the SIWF telecommunications node 190 extracts the IWF control data 390 encapsulated within the optional parameters of the received ISUP signal 350 and identifies the appropriate IWF hardware or software device. For example, for a modem call connection request, the modem 120 is seized with appropriate parameters and settings as indicated by the extracted IWF control data and linked 370 with the first circuit call connection 200. Accordingly, the modem 120 now has access to analog or digital data communicated over the first circuit call connection 200.

For a terminal call connection towards the mobile station 20, the SIWF application module 180 transmits another call setup ISUP signal 360, such as an IAM, back to the serving MSC 30. Again, the optional parameters within the transmitted ISUP signal contains IWF control data 380 indicating the results of the modem seizure by the SIWF application module 180. As a result, a second circuit call connection 210 is established between the serving MSC 30 and the SIWF telecommunications node 190. The second circuit call connection 210 is further connected with the first circuit call connection 200 and, in turn, with the modem device. The circuit call connections 200 and 210 may pass through one or more switches 500 (e.g., intermediate tandem switches) in order to communicate data between the serving MSC 30 and the SIWF node 190. As a result of signals over call connections 200–210, data altered or controlled by the modem over the first circuit call connection 200 are transported back to the serving MSC 30 using the second circuit call connection 210. The altered data are then transmitted by the serving MSC 30 to the mobile station 20 over the radio channel 80.

On the other hand, for an outgoing call connection originated by the mobile station 20, there is no need for the SWIF node 190 to route the altered data back to the serving MSC 30. The SWIF node 190 may directly route the altered data to the called party terminal, for example, by establishing a trunk call connection with the connected SS7 telecommunications network.

Figure 7:
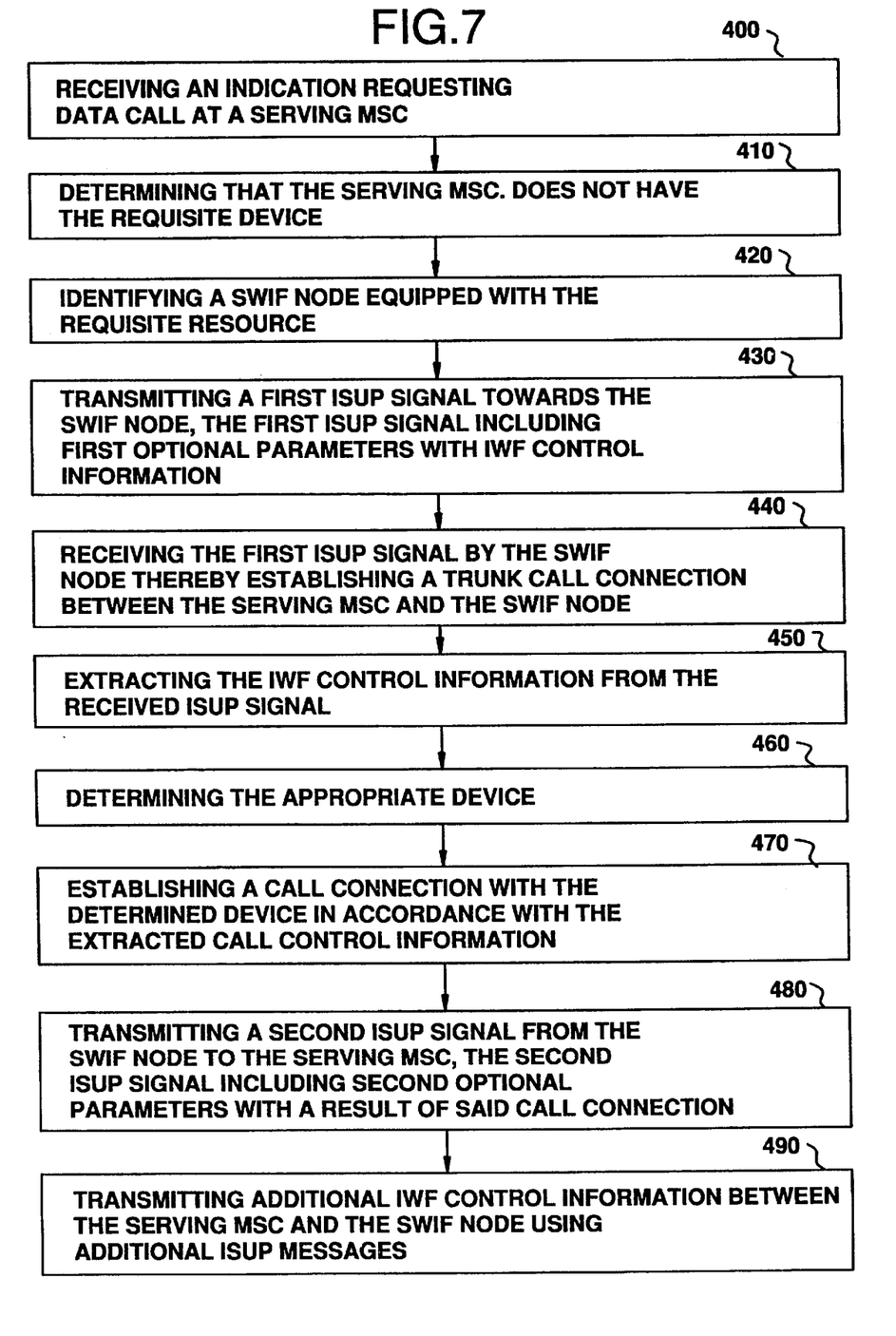
FIG. 7 is a flow diagram illustrating the steps performed for providing data service to a mobile station via a SIWF node in accordance with the teachings of the present invention.

Reference is now made to FIG. 7 illustrating the steps performed for providing IWF service to a mobile station for a terminating call in accordance with the teachings of the present invention. As described above, the serving MSC receives an indication requesting IWF service towards the mobile station over the connected SS7 telecommunications network at step 400. Furthermore, such an indication may also be received during an already established call connection. For example, a request to switch from voice to data may be received by the serving MSC over an existing call connection. At step 410, the IWF application module within the serving MSC determines that the serving MSC is not equipped to properly provide the requested IWF service towards the mobile station. In response to such a determination, the IWF application module identifies a SIWF node capable of providing the requested IWF service to the mobile station at step 420. The serving MSC then transmits a first ISUP signal towards the determined SIWF telecommunications node thereby establishing a first circuit call connection between the serving MSC and the identified SIWF telecommunications node at steps 430 and 440. The transmitted ISUP signal further encapsulates the IWF control data within its optional parameters in accordance with the teachings of the present invention. The SIWF telecommunications node then extracts the encapsulated IWF control data from the received ISUP signal at step 450. Utilizing the received IWF control data, the SIWF telecommunications node determines the appropriate IWF device or module to seize at step 460. Applying the parameters and settings as indicated by the received control data, the seized IWF device or module is linked with the first circuit call connection at step 470. The seized IWF device or module is now able to intercept the data transmitted over the first circuit call connection and to alter or manipulate the data to conform to the requested IWF service. The SIWF telecommunications node then transmits another ISUP signal, such as an Initial Address Message (IAM), back to the serving MSC to establish a second circuit call connection at step 480. The transmitted IAM signal further includes additional control data indicating the results of the device seizure in its optional parameter. The altered or manipulated data are then communicated back to the serving MSC over the second circuit call connection, and the serving MSC appropriately routes the received altered data to the final destination. Thereafter, whenever the serving MSC or the SIWF telecommunications node further wishes to communicate additional control data during the established call connections, supplementary ISUP signals, such as a Call Progress (CPG) message, can be transmitted encapsulating the additional control data. For example, an instruction to switch from data call back to voice call after the completion of a modem connection can be communicated using a CPG message. As a result, the first and second circuit call connections between the serving MSC and the SIWF telecommunications node are released and the serving MSC hereinafter independently provides the requested mobile service.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for providing a telecommunications service for a mobile station within a telecommunications network, said method comprising the steps of:

receiving an indication to provide the telecommunications service to said mobile station at a first telecommunications node;

determining that said first telecommunications node is not capable of providing the telecommunications service;

identifying a second telecommunications node capable of providing said indicated telecommunications service;

establishing a first circuit call connection from said first telecommunications node to said second telecommunications node using a first Integrated Service Digital Network User Part (ISUP) signal, said first ISUP signal including control data and traffic data necessary for providing the telecommunications service and for transporting the control data and the traffic data from the first telecommunications node to the second telecommunications node;

extracting said control data and the traffic data from said first ISUP signal at said second telecommunications node;

altering the extracted traffic data in accordance with the extracted control data; and sending the altered traffic data from the second telecommunications node to said first telecommunications node when terminating a call to the mobile station; or sending the altered traffic data from the second telecommunications node to a called party terminal when the mobile station is an originator of the call.

2. The method of claim 1, wherein said step of sending the altered traffic data from the second telecommunications node to said first telecommunications node further comprising the step of establishing a second circuit call connection from said second telecommunications node to said first telecommunications node using a second ISUP signal.

3. The method of claim 1 wherein said first telecommunications node includes a mobile switching center (MSC) for serving said mobile station.

4. The method of claim 1 wherein said second telecommunications node includes a mobile switching center (MSC).

5. The method of claim 1 wherein said second telecommunications node includes a Signaling System No. 7 (SS7) based telecommunications node for receiving and processing said first ISUP signal.

6. The method of claim 1 wherein said telecommunications service includes non-speech data communications by modem.

7. The method of claim 6 wherein said telecommunications service requires a fax adapter.

8. The method of claim 7 wherein said control data comprises:

baud rate;

parity data; and terminal protocol.

9. The method of claim 1 wherein said indication comprises a Direct Transfer Application Part (DTAP) transmitted by the mobile station for originating a call connection.

10. The method of claim 1 wherein said indication comprises a termination call connection towards said mobile station.

11. The method of claim 1 wherein said first ISUP signal includes an optional parameter wherein said control data are encapsulated.

12. A method of transmitting data packets constructed in accordance with an Integrated Services Digital Network User Part (ISUP) protocol standard in a data network connecting a plurality of mobile switching centers (MSCs) in a cellular radio telecommunications network providing both voice and data services to a plurality of subscribers, said MSCs being connected by said data network to a network node which provides a plurality of interworking functions for the processing of data associated with data calls of said subscribers, said method comprising the steps of:

inserting into each data packet a label containing an identification of a source MSC and the network node for said packet;

inserting into said data packet an information field containing a message requesting that a first circuit call connection be set up between the source MSC and the network node;

inserting into said data packet control data for specifying the type of interworking function required by a particular subscriber at said source MSC where said control data is included as one of a plurality of optional parameters within the information field of said ISUP protocol data packet;

sending said data packet from said source MSC to said network node;

setting up the first circuit call connection between said network node and said source MSC;

connecting, in accordance with the control data within said data packet, a selected one of said plurality of interworking functions to said first circuit call connection within said network node for processing of data associated with data calls of said particular subscriber;

sending data associated with data calls of said particular subscriber from said source MSC to said network node for processing by said selected interworking function;

generating at said network node a second data packet having a label containing an identification of said network node as being the source of the second data packet and said source MSC as the destination of said second data packet;

inserting into said second data packet an information field containing a message requesting that a second circuit call connection be set up between said network node and said source MSC;

inserting into said second data packet control data for specifying the results of providing interworking function which was selected at said network node and connected to said first call connection;

sending said second data packet from said source MSC to said network node;

processing data associated with data calls of said particular subscriber with said selected interworking function at said network node; and sending said processed data from said network node to said source MSC over said second call connection.

13. In a cellular radiotelephone system network carrying high speed digital messages between a plurality of mobile switching centers (MSCs) serving mobile subscribers with both voice and data calls in different geographic areas within said network, said system network comprising:

a first network node having an MSC serving a particular mobile subscriber requesting data call services;

a second network node having an application module for providing a plurality of interworking functions;

said applications module for altering a digital data message received at the second network mode in accordance with control data;

a signaling system for carrying the digital data messages between said first and second network nodes related to the providing of the call services to said subscriber, said signaling system incorporating a communications protocol including:

a first data packet label comprising an identification of said first network node as a source mode and said second network node as a network node; and a first information block comprising:

a message being sent from said source node to said destination network node requesting that a first circuit call connection be set up between them; and first control data for specifying a type of interworking function required at said network node by the subscriber at said source node.

14. In a cellular radiotelephone system network as set forth in claim 13, wherein said communication protocol further comprising:

a second data packet label comprising an identification of said network node as being the source and said source node as being the destination; and a second information block comprising:

a second message being sent from said network node to said source node requesting that a second circuit call connection be set up between them for sending altered data processed by said interworking function to said source node serving said subscriber; and second control data for specifying the results of providing the interworking function which was selected at said network node and connected to said first call connection.

15. The method of claim 1, wherein said step of sending the altered traffic data from the second telecommunications node to a called party terminal further comprising the step of establishing a trunk call connection from said second telecommunications node to the called party terminal using a second ISUP signal.

16. A system for providing telecommunications services for a mobile station within a telecommunications network, said system comprising:

a serving mobile switching center including a serving application module for identifying control data associated with a selected one of the telecommunications services;

a telecommunications node;

said serving application module for establishing a first call connection by transmitting a first Integrated Service Digital Network User Part (ISUP) signal having the control data and traffic data to the telecommunications node;

said telecommunications node includes a shared application module for extracting the control data and traffic data from the first ISUP signal and for seizing in response to the extracted control data a module, said module for altering the extracted traffic data in accordance with the extracted control data.

17. The system of claim 16, wherein said shared application module further includes means for establishing a second call connection to the serving mobile switching center by transmitting a second Integrated Service Digital Network User Part (ISUP) signal having the altered traffic data.

18. The system of claim 17, wherein said serving mobile switching center includes means for transmitting over a radio channel the altered traffic data to the mobile station.

19. The system of claim 16, wherein said shared application module further includes means for establishing a trunk call connection to a called party destination by transmitting a second Integrated Service Digital Network User Part (ISUP) signal having the altered traffic data when the mobile station is an originator of a call.

20. The system of claim 16, wherein said serving application module further includes means for receiving an indication message requesting the selected one of the telecommunications services.

21. The system of claim 20, wherein said indication message includes a DTAP signal for an outgoing call connection, a terminating call setup signal for an incoming call connection, and a service code for an established call connection.

22. The system of claim 16, wherein said first ISUP signal includes an optional part for encapsulating the identified control data.

23. The system of claim 16, further comprising an intermediate node located between the serving mobile switching center and the telecommunication node, where said control data is transported transparently through the intermediate node.

24. The system of claim 16, wherein the control data includes parameters and settings for connecting to the module.

25. The system of claim 16, wherein the telecommunications service is selected from a group comprising:
- BS 2× (asynchronous bearer services) interworking either with the 3.1 KHz audio mode or in UDI mode;
- BS 3× (synchronous bearer services) interworking either with the 3.1 KHz audio mode or in UDI mode;
- TS 61 and 62 (facsimile group 3 teleservices) interworking only with the 3.1 KHz audio mode;
- BS 4× (PAD Access);
- BS 5× (Packet Access);
- BS61 (Alternate Speech/Data);
- BS81 (Speech followed by data);
- data compression for Non Transparent Data services; and
- high speed circuit switched data (HSCSD).

26. A method for communicating control data and traffic data associated with a telecommunications service between a mobile switching center serving a mobile station and a telecommunications node equipped to provide said telecommunications service, said method comprising the steps of:
- identifying control data associated with said telecommunications service;
- establishing a first circuit call connection from said mobile switching center to said telecommunications node using a first Integrated Service Digital Network User Part (ISUP) signal, said first ISUP signal includes control data and traffic data;
- seizing in response to the control data a module;
- altering the traffic data using the module in accordance with the control data;
- establishing a second circuit call connection from said telecommunications node to said mobile switching center using a second Integrated Service Digital Network User Part (ISUP) signal;
- linking the module to the first circuit call connection and the second circuit call connection; and
- sending the altered traffic data from the telecommunications node to the mobile switching center when terminating a call to the mobile station; or
- sending the altered traffic data from the telecommunications node to a called party terminal when the mobile station is an originator of the call.

27. The method of claim 26, wherein the step of establishing a first circuit call connection includes encapsulating the control data into an optional part of the first ISUP signal.

28. The method of claim 27, wherein the step of encapsulating includes extracting said encapsulated control data from said first ISUP signal at said second telecommunications node.

* * * * *

UNITED STATES PATENT AND TRADEMARK OFFICE
CERTIFICATE OF CORRECTION

PATENT NO. : 5,850,391
DATED : Dec. 15, 1998
INVENTOR(S) : Essigmann

It is certified that error appears in the above-identified patent and that said Letters Patent is hereby corrected as shown below:

Column 5, line 59    Replace "Enode"
                     With --node--

Signed and Sealed this

Fourth Day of May, 1999

Attest:

Attesting Officer

Q. TODD DICKINSON

Acting Commissioner of Patents and Trademarks